US008737732B2

(12) United States Patent  
Kim et al.

(10) Patent No.: US 8,737,732 B2
(45) Date of Patent: May 27, 2014

(54) IMAGE PROCESSING DEVICE

(75) Inventors: Kyoung-Man Kim, Suwon-si (KR); Jong-Ho Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/361,325

(22) Filed: Jan. 30, 2012

(65) Prior Publication Data
US 2012/0195503 A1 Aug. 2, 2012

(30) Foreign Application Priority Data

Jan. 31, 2011 (KR) ........................ 10-2011-0009207

(51) Int. Cl.
*G06K 9/00* (2006.01)
(52) U.S. Cl.
USPC ........................................................ 382/167
(58) Field of Classification Search
None
See application file for complete search history.

(56) References Cited

U.S. PATENT DOCUMENTS

| | | | | |
|---|---|---|---|---|
| 5,799,111 A * | 8/1998 | Guissin | ........................ | 382/254 |
| 6,188,454 B1 * | 2/2001 | Greene et al. | ................... | 349/74 |
| 6,912,306 B1 * | 6/2005 | Nakabayashi et al. | ........ | 382/167 |
| 7,038,727 B2 * | 5/2006 | Majumder et al. | ............ | 348/383 |
| 7,936,823 B2 * | 5/2011 | Suzuki | ...................... | 375/240.16 |
| 2002/0041708 A1 * | 4/2002 | Pettitt | .......................... | 382/167 |
| 2004/0036704 A1 * | 2/2004 | Han et al. | ...................... | 345/690 |
| 2004/0085477 A1 * | 5/2004 | Majumder et al. | ............ | 348/383 |
| 2004/0240553 A1 * | 12/2004 | Kurihara et al. | ......... | 375/240.16 |
| 2005/0031056 A1 * | 2/2005 | Thomas | ....................... | 375/343 |
| 2005/0253827 A1 * | 11/2005 | Hung et al. | .................... | 345/204 |
| 2008/0095464 A1 * | 4/2008 | Goertzen et al. | ............. | 382/278 |
| 2008/0095466 A1 * | 4/2008 | Kinrot et al. | .................. | 382/284 |

FOREIGN PATENT DOCUMENTS

| | | |
|---|---|---|
| JP | 2004-229005 A | 8/2004 |
| JP | 2007147852 A | 6/2007 |
| JP | 2007-178772 A | 7/2007 |

* cited by examiner

*Primary Examiner* — Daniel Mariam
*Assistant Examiner* — Feng Niu
(74) *Attorney, Agent, or Firm* — Sughrue Mion, PLLC

(57) ABSTRACT

An image processing device includes a first image enhancer and a second image enhancer. The first image enhancer receives first image data and generates first image enhancement information by analyzing the first image data. The second image enhancer receives second image data and generates second image enhancement information by analyzing the second image data. The first image enhancer converts the first image data into first enhanced image data based on the first image enhancement information and the second image enhancement information. The second image enhancer converts the second image data into second enhanced image data based on the first image enhancement information and the second image enhancement information.

17 Claims, 9 Drawing Sheets

IMAGE PROCESSING DEVICE

CROSS-REFERENCE TO RELATED PATENT APPLICATION

This application claims priority from Korean Patent Application No. 10-2011-0009207, filed on Jan. 31, 2011, in the Korean Intellectual Property Office, the contents of which are incorporated herein in its entirety by reference.

BACKGROUND

1. Field

The present inventive concept relates to processing of image data to be displayed, and more particularly to an image processing device for providing enhanced image data for a plurality of display devices.

2. Description of the Related Art

Recently, various display devices such as plasma display panel (PDP) devices, liquid crystal display (LCD) devices, light emitting diode (LED) devices, etc. are widely used. A plurality of display devices may be used in a single system to provide various images. For example, images may be displayed in the plurality of display devices, respectively, or a single image may be divided into a plurality of images to be displayed in the plurality of display devices.

SUMMARY

The present inventive concept provides an image processing device for providing homogeneous images to be displayed in a plurality of display devices.

According to an aspect of an exemplary embodiment, an image processing device includes a first image enhancer and a second image enhancer. The first image enhancer receives a first image data and generates first image enhancement information by analyzing the first image data. The first image enhancer converts the first image data into first enhanced image data based on the first image enhancement information and second image enhancement information. The second image enhancer receives second image data and generates the second image enhancement information by analyzing the second image data. The second image enhancer converts the second image data into second enhanced image data based on the first image enhancement information and the second image enhancement information.

Each of the first image enhancement information and the second image enhancement information may include at least one of image brightness information, image contrast information and image histogram information.

The first image enhancer and the second image enhancer may convert the first image data and the second image data into the first enhanced image data and the second enhanced image data, respectively, by performing at least one of brightness correction, contrast correction, color correction and noise removal.

The image processing device may further include a control unit configured to generate a first enable signal and a second enable signal based on information regarding whether the first image data and the second image data are correlated with each other.

The control unit may deactivate the first enable signal and the second enable signal when the first image data and the second image data are not correlated with each other. In this case, the first image enhancer may convert the first image data into the first enhanced image data based on the first image enhancement information regardless of the second image enhancement information when the first enable signal is deactivated, and the second image enhancer may convert the second image data into the second enhanced image data based on the second image enhancement information regardless of the first image enhancement information when the second enable signal is deactivated.

The control unit may include a first register configured to generate the first enable signal, and a second register configured to generate the second enable signal.

An exemplary embodiment may receive the first image data and the second image data from an external memory device. The image processing device may further include a direct memory access controller configured to directly communicate with the external memory device through a system bus.

Another exemplary embodiment may receive the first image data and the second image data as an image stream.

The image processing device may further include a first mixer configured to receive a first plurality of sub-image data and combine the first plurality of sub-image data to generate the first image data, and a second mixer configured to receive a second plurality of sub-image data and combine the second plurality of sub-image data to generate the second image data.

The image processing device may further include a first timing controller configured to control a timing of displaying an image corresponding to the first enhanced image data in a first display device, and a second timing controller configured to control a timing of displaying an image corresponding to the second enhanced image data in a second display device.

The first image enhancer and the second image enhancer may be integrated in a single system-on-chip.

According to an aspect of an exemplary embodiment, an image processing device includes an image enhancer and an image converter. The image enhancer receives an input image data and generates an enhanced image data based on the input image data. The image converter receives the enhanced image data, converts a first portion of the enhanced image data into first enhanced image data to be provided to a first display device, and converts a second portion of the enhanced image data into second enhanced image data to be provided to a second display device.

The image converter may include a first formatter configured to convert the first portion of the enhanced image data into the first enhanced image data and a second formatter configured to convert a second portion of the enhanced image data into a second enhanced image data to be provided to a second display device.

The image processing device may further include a control unit configured to generate an enable signal based on information regarding whether the first portion of the enhanced image data and the second portion of the enhanced image data are correlated with each other.

The control unit may deactivate the enable signal when the first portion of the enhanced image data and the second portion of the enhanced image data are not correlated with each other. The image enhancer may generate the first portion of the enhanced image data based on a first portion of the input image data regardless of a second portion of the input image data and generate the second portion of the enhanced image data based on the second portion of the input image data regardless of the first portion of the input image data, when the enable signal is deactivated.

BRIEF DESCRIPTION OF THE DRAWINGS

Illustrative, non-limiting exemplary embodiments will be more clearly understood from the following detailed description taken in conjunction with the accompanying drawings in which.

DETAILED DESCRIPTION OF THE EMBODIMENTS

Figure 1:
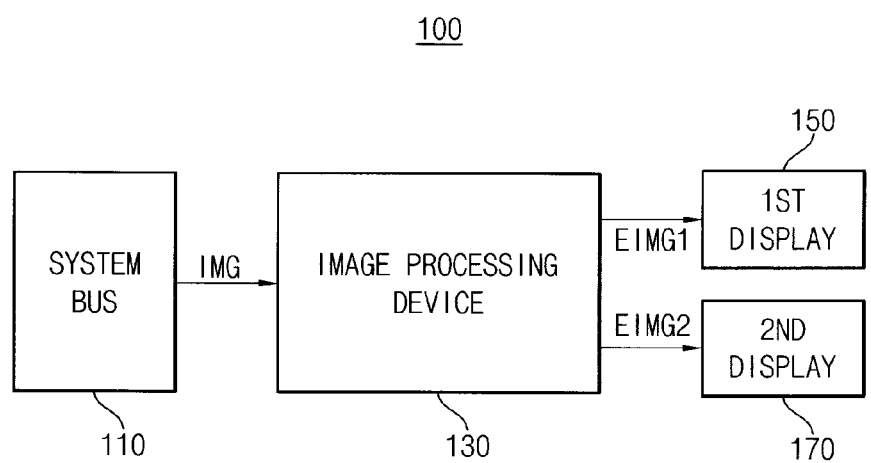
FIG. 1 is a conceptual diagram illustrating a system including an image processing device according to exemplary embodiments.

The present inventive concept will be described more fully hereinafter with reference to the accompanying drawings, in which some exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a conceptual diagram illustrating a system including an image processing device according to exemplary embodiments.

Referring to FIG. 1, a system 100 includes a system bus 110, an image processing device 130 and a plurality of display devices 150 and 170. The image processing device 130 processes input image data IMG to provide a plurality of enhanced image data EIMG1 and EIMG2 to be displayed in the plurality of display devices 150 and 170, respectively.

The system bus 110 may represent electrical paths for transferring signals between various devices such as a central processing unit (CPU), a cache memory, a main memory, input-output devices, etc. in the system 100. The system bus 110 may be an industry standard architecture (ISA) bus, an extended industry standard architecture (EISA) bus, a video electronics standards association (VESA) bus, a peripheral component interconnect (PCI) bus, etc., depending on an amount of data to be processed. The image processing device 130 may communicate with other devices in the system 100 through the system bus 110. As will be described with reference to FIG. 13, a system may further include a processor 510, a memory device 520, a storage device 530, an input-out device 550, etc, which are coupled to a system bus 570.

The image processing device 130 converts the input image data IMG received through the system bus 110 into first enhanced image data to be displayed in a first display device 150 and second enhanced image data to be displayed in a second display device 170. Even though two display devices 150 and 170 are illustrated in FIG. 1 for convenience of description, it will be easily understood that three or more display devices may be included in a single system. In this case, the image processing device 130 may convert the input image data IMG into three or more enhanced image data according to the number of display devices included in the system 100.

The image processing device 130 may process the input image data IMG to provide the enhanced image data EIMG1 and EIMG2 having substantially the same image quality to the plurality of display devices 150 and 170.

Figure 2:
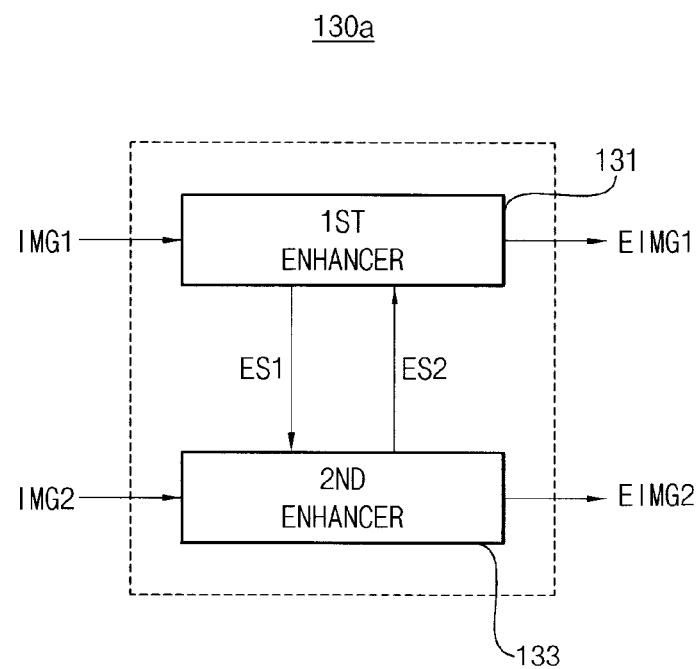
FIG. 2 is a block diagram illustrating an image processing device according to an exemplary embodiment.

FIG. 2 is a block diagram illustrating an image processing device according to an exemplary embodiment.

Referring to FIG. 2, an image processing device 130*a* includes a first image enhancer 131 and a second image enhancer 133.

The first image enhancer 131 receives first image data IMG1 and generates first image enhancement information ES1 by analyzing the first image data IMG1. The first image enhancement information ES1 may be used for image processing not only in the first image enhancer 131 but also in the second image enhancer 133. For such correlated or homogeneous image processing, the first image enhancement information ES1 may be provided to the second image enhancer 133 and the first image enhancer 131 may receive second image enhancement information ES2 from the second image enhancer 133. The first image enhancer 131 converts the first image data IMG1 into a first enhanced image data EIMG1 based on the first image enhancement information ES1 and the second image enhancement information ES2. The first enhanced image data EIMG1 is provided to and displayed by the first display device 150 (see FIG. 1). The second image enhancement information ES2 as well as the first image enhancement information ES1 may be used to convert the first image data IMG1 to the first enhanced image data EIMG1.

The second image enhancer 132 receives second image data IMG2 and generates the second image enhancement information ES2 by analyzing the second image data IMG2. The second image enhancement information ES2 may be used for image processing not only in the second image enhancer 133 but also in the first image enhancer 131. For such correlated or homogeneous image processing, the second image enhancement information ES2 may be provided to the first image enhancer 131 and the second image enhancer 133 may receive the first image enhancement information ES1 from the first image enhancer 131. The second image enhancer 133 converts the second image data IMG2 into second enhanced image data EIMG2 based on the first image enhancement information ES1 and the second image enhancement information ES2. The second enhanced image data EIMG2 is provided to and displayed by the second display device 170 (see FIG. 1). The first image enhancement information ES1 as well as the second image enhancement information ES2 may be used to convert the second image data IMG2 to the second enhanced image data EIMG2.

In the conventional image processing, the first image enhancer 131 processes the first image data IMG1 without the second image enhancement information ES2 and the second image enhancer 133 processes the second image data IMG 2 without the first image enhancement information ES1. That is, each image enhancer performs image processing based on the image enhancement information of the respective image data to be processed therein. In this case, the method and the extent of image enhancing process may be different from each other because image sources are considered as being independent of each other even when the first and second image data IMG1 and IMG2 are originated from a single image. If the first and second image data IMG1 and IMG2 are not correlated with each other, the conventional image processing does not cause a serious problem. However, when the first and second image data IMG1 and IMG 2 are correlated, for example, when the first and second image data IMG1 and IMG2 are divided from a single image, the difference of the image enhancing process may cause visual heterogeneity between the images simultaneously displayed by the plurality of display devices. On the other hand, according to exemplary embodiments, the first image enhancer 131 converts the first image data IMG1 to the first enhanced image data EIMG1 based on not only the first image enhancement information ES1 but also the second image enhancement information ES1 that is provided by the second image enhancer 133, and the second image enhancer 133 converts the second image data IMG2 to the second enhanced image data EIMG2 based on not only the second image enhancement information ES2 but also the first image enhancement information ES1 that is provided by the first image enhancer 131. Thus visual heterogeneity between the first and second enhanced image data EIMG1 and EIMG2 may be reduced or prevented.

In some exemplary embodiments, each of the first image enhancement information ES1 and the second image enhancement information ES2 may include at least one of image brightness information, image contrast information and image histogram information.

The first image enhancer 131 and the second image enhancer 133 may perform various image enhancing processes. For example, the first image enhancer 131 and the second image enhancer 133 may convert the first image data IMG1 and the second image data IMG2 into the first enhanced image data EIMG1 and the second enhanced image data EIMG2, respectively, by performing at least one of brightness correction, contrast correction, color correction and noise removal.

For convenience of illustration, the image processing device 130 of FIG. 1 is depicted as receiving image data IMG through the system bus 110, and the image processing device 130a of FIG. 2 is depicted as receiving first and second image data IMG1 and IMG2. The first and second image data IMG1 and IMG2 of FIG. 2 may be respective portions of the input image data IMG of FIG. 1. In other words, the first image data IMG1 may correspond to an image to be displayed in the first display device 150 and the second image data IMG2 may correspond to another image to be displayed in the second display device 170. An original single image corresponding to the input image data IMG may be divided into images respectively displayed by the plurality of display devices 150 and 170.

As described above, in the image processing device 130a according to exemplary embodiments, the plurality of image enhancers 131 and 133 receives the image enhancement information of the correlated image and thus homogeneous image processing may be performed with respect to the plurality of images. Accordingly, the image processing device according to exemplary embodiments may reduce or prevent visual heterogeneity between images that are simultaneously displayed by the plurality of display devices.

In some exemplary embodiments, the first and second image data IMG1 and IMG2 may be received from an external memory device. In other exemplary embodiments, the first and second image data IMG1 and IMG2 may be received as an image stream.

Even though FIG. 2 illustrates the image processing device 130a that provides the enhanced image data EIMG1 and EIMG2 for the two display devices 150 and 170, the image processing device 130a may provide the enhanced image data for three or more display devices. In other words, the image processing device 130a may include N image enhancers that provide N enhanced image data for N display devices, where N is an arbitrary natural number greater than two. In this case, each image enhancer may communicate with the other N−1 image enhancers to provide the image enhancement information thereof. Such communication may be performed through individual links between every two image enhancers or through an inter bus to which all the image enhancers are coupled.

Figure 3:
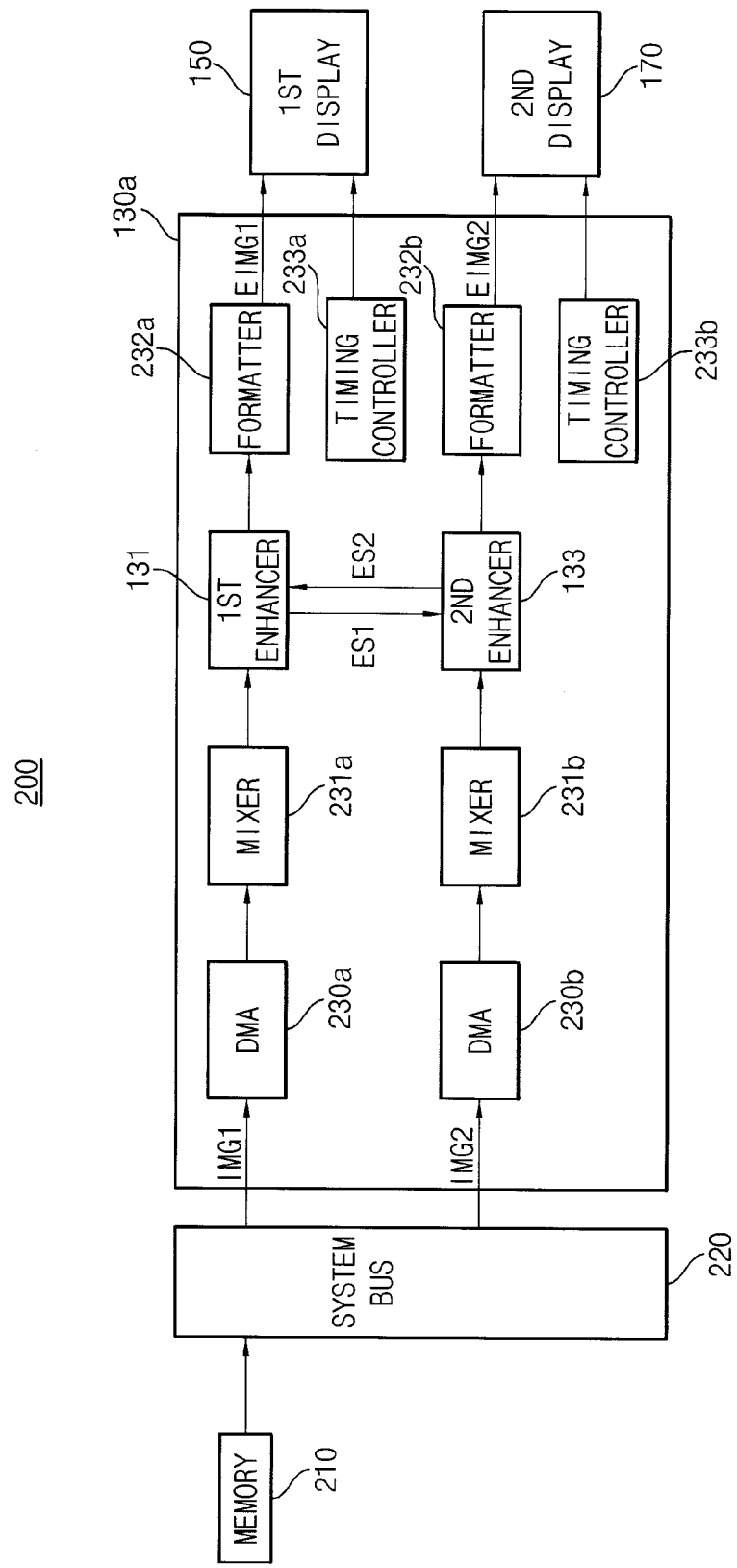
FIG. 3 is a block diagram illustrating a system including the image processing device of FIG. 2.

FIG. 3 is a block diagram illustrating a system including the image processing device of FIG. 2.

Referring to FIG. 3, a system 200 includes a memory device 210, a system bus 220, an image processing device 130a, a first display device 150, and a second display device 170. The image processing device 130a includes a first image enhancer 131 and a second image enhancer 133. The image processing device 130a may further include direct memory access (DMA) controllers 230a and 230b, mixers 231a and 231b, formatters 232a and 232b, and timing controllers 233a and 233b.

The memory device 210 and the image processing device 130a may communicate with each other through the system bus 220. The image processing device 130a may receive first image data IMG1 and second image data IMG2 under control of the DMA controllers 230a and 230b. Using such DMA controllers 230a and 230b, the image processing device 130a may receive the input image data IMG1 and IMG2 independently of another processor, such as a CPU, coupled to the system bus 220. The DMA controllers 230a and 230b may include respective input-output interfaces to control the data transfer through the system bus 220.

Each mixer may combine a plurality of sub-image data into one image. That is, the first mixer 231a may receive a first plurality of sub-image data and combine the first plurality of sub-image data to generate the first image data IMG1, and the second mixer 231b may receive a second plurality of sub-image data and combine the second plurality of sub-image data to generate the second image data IMG2. When a plurality of application programs is driven in the system 200, the sub-images provided by the applications are required to be combined into one image. For example, each mixer may combine on-screen display (OSD) data and pure image data into the image data corresponding to a single image.

Each timing controller may control a timing of displaying an image corresponding to each enhanced image data in each display device. That is, the first timing controller 233a may control a timing of displaying an image corresponding to the first enhanced image data EIMG1 in the first display device 150, and the second timing controller 233b may control a timing of displaying an image corresponding to the second enhanced image data EIMG2 in the second display device 170. The first and second timing controllers 233a and 233b may generate control signals to control operation timings of the display devices 150 and 170.

The formatters 232a and 232b may convert the outputs of the image enhancers 131 and 133 so that the enhanced image data EIMG1 and EIMG2 may have appropriate formats to be displayed in the corresponding display devices 150 and 170.

As illustrated in FIG. 3, the input image data IMG1 and IMG2 may be received from the memory device 210. In other exemplary embodiments the input image data IMG1 and IMG2 may be received as an image stream or a bit stream, for example, from an interface for wireless communication.

In some exemplary embodiments, the image processing device 130a including a plurality of image enhancers 131 and 133 may be integrated in a single system-on-chip (SOC). In other cases, for example but not limited to mobile devices, the memory device 210 and the system bus 220 and other components may be further integrated in the system-on-chip together with the image processing device 130a.

Figure 4:
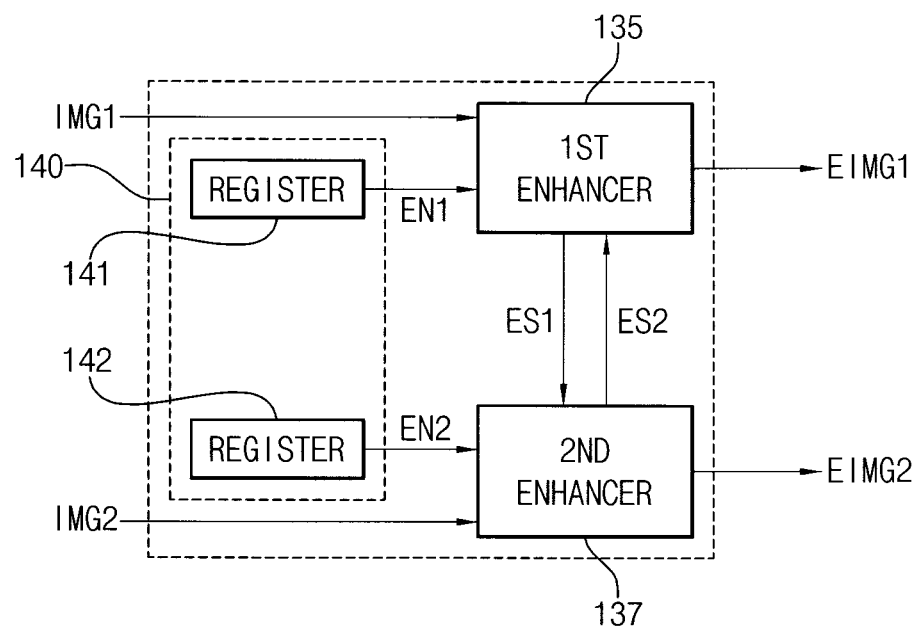
FIG. 4 is a block diagram illustrating an image processing device according to another exemplary embodiment.

FIG. 4 is a block diagram illustrating an image processing device according to another exemplary embodiment.

Referring to FIG. 4, an image processing device 130b includes a first image enhancer 135, a second image enhancer 137 and a control unit 140. The first image enhancer 135 receives first image data IMG1 and generates first image enhancement information ES1 by analyzing the first image data IMG1. The second image enhancer 137 receives second image data IMG2 and generates second image enhancement information ES2 by analyzing the second image data IMG2.

The control unit 140 generates a first enable signal EN1 and a second enable signal EN2 based on information regarding whether the first image data IMG1 and the second image data IMG2 are correlated with each other. The correlation information may be determined based on the relation between the first and second image data IMG1 and IMG2. For example, when the first and second image data IMG1 and IMG2 are divided from a single image, it is determined that the first and second image data IMG1 and IMG2 are correlated. In this case, the first and second enhanced image data EIMG1 and EIMG2 are required to have substantially the same quality so that the displayed images by the plurality of display devices do not cause visual heterogeneity. The image processing device 130b may process the first and second image data IMG1 and IMG2 with the same method and the same extent of image enhancing, when the first and second image data IMG1 and IMG2 are correlated. Whether the first and second image data IMG1 and IMG2 are correlated may be determined according to the nature of images corresponding to the image data IMG1 and IMG2 to be processed, characteristics of the application programs providing the image data IMG1 and IMG2, or input operation of the user.

Communication between the first and second image enhancers 135 and 137 may be required according to whether the first and second image data IMG1 and IMG2 are correlated. When the first and second image data IMG1 and IMG2 are not correlated, for example, when the first and second image data IMG1 and IMG2 are distinct from each other, there is no necessity of considering the visual heterogeneity between the images. In other words, it is desirable to process the image data IMG1 and IMG2 independently of each other when the image data IMG1 and IMG2 are not correlated. Accordingly the first image enhancer 135 may convert the first image data IMG1 into the first enhanced image data EIMG1 based on only the first image enhancement information ES1 and the second image enhancer 137 may convert the second image data IMG2 into the second enhanced image data EIMG2 based on only the second image enhancement information ES1 when the first and second image data IMG1 and IMG2 are not correlated.

The control unit 140 generates a first enable signal EN1 and a second enable signal EN2 based on information regarding whether the first image data IMG1 and the second image data IMG2 are correlated with each other. The first image enhancer 135 may determine the method of image enhancing process thereof based on the first enable signal EN1 and the second image enhancer 137 may determine the method of image enhancing process thereof based on the second enable signal EN2. The control unit 140 may deactivate the first enable signal EN1 and the second enable signal EN2 when the first image data IMG1 and the second image data IMG2 are not correlated with each other. The first image enhancer 135 may convert the first image data IMG1 into the first enhanced image data EIMG1 based on the first image enhancement information ES1 regardless of the second image enhancement information ES2 when the first enable signal EN1 is deactivated. The second image enhancer 137 may convert the second image data IMG2 into the second enhanced image data EIMG2 based on the second image enhancement information ES2 regardless of the first image enhancement information ES1 when the second enable signal EN2 is deactivated. The first and second image enhancers 135 and 137 may perform homogeneous image enhancing processes based on both of the image enhancement information ES1 and ES2 when the first and second enable signals EN1 and EN2 are activated, and the first and second image enhancers 135 and 137 may perform image enhancing processes independently based on each of the image enhancement information ES1 and ES2 when the first and second enable signals EN1 and EN2 are deactivated.

The information regarding whether the first and second image data IMG1 and IMG2 are correlated may be included in the input image data IMG1 and IMG2 or may be provided by a signal distinct from the input image data IMG1 and IMG2. The correlation information may be determined according to characteristics of the input image data IMG1 and IMG2, or may be determined by an external control signal. For example, the correlation information may be determined by input operation of the user. The control unit 140 may control the correlated or independent process of the first and second image enhancers 135 and 137 based on enable signals EN1 and EN2.

In some exemplary embodiments, the control unit 140 may include a first register 141 configured to generate the first enable signal EN1 to control the operation of the first image enhancer 135 and a second register 142 configured to generate the second enable signal EN2 to control the operation of the second image enhancer 137. Even though FIG. 4 illustrates the two registers 141 and 142 for respectively controlling the two image enhancers 135 and 137, the control unit 140 may include one register for commonly controlling the two image enhancers 135 and 137 through a single enable signal.

Even though FIG. 4 illustrates the image processing device 130b that processes the image data for the two display devices, the image processing device 130b may process image data for three or more display devices. That is, the image processing device may include N image enhancers where N is an arbitrary natural number greater than two. The control unit may control the image enhancers with one or more enable signals so that the image enhancers may perform the correlated image enhancing process or independent image enhancing process.

Figure 5:
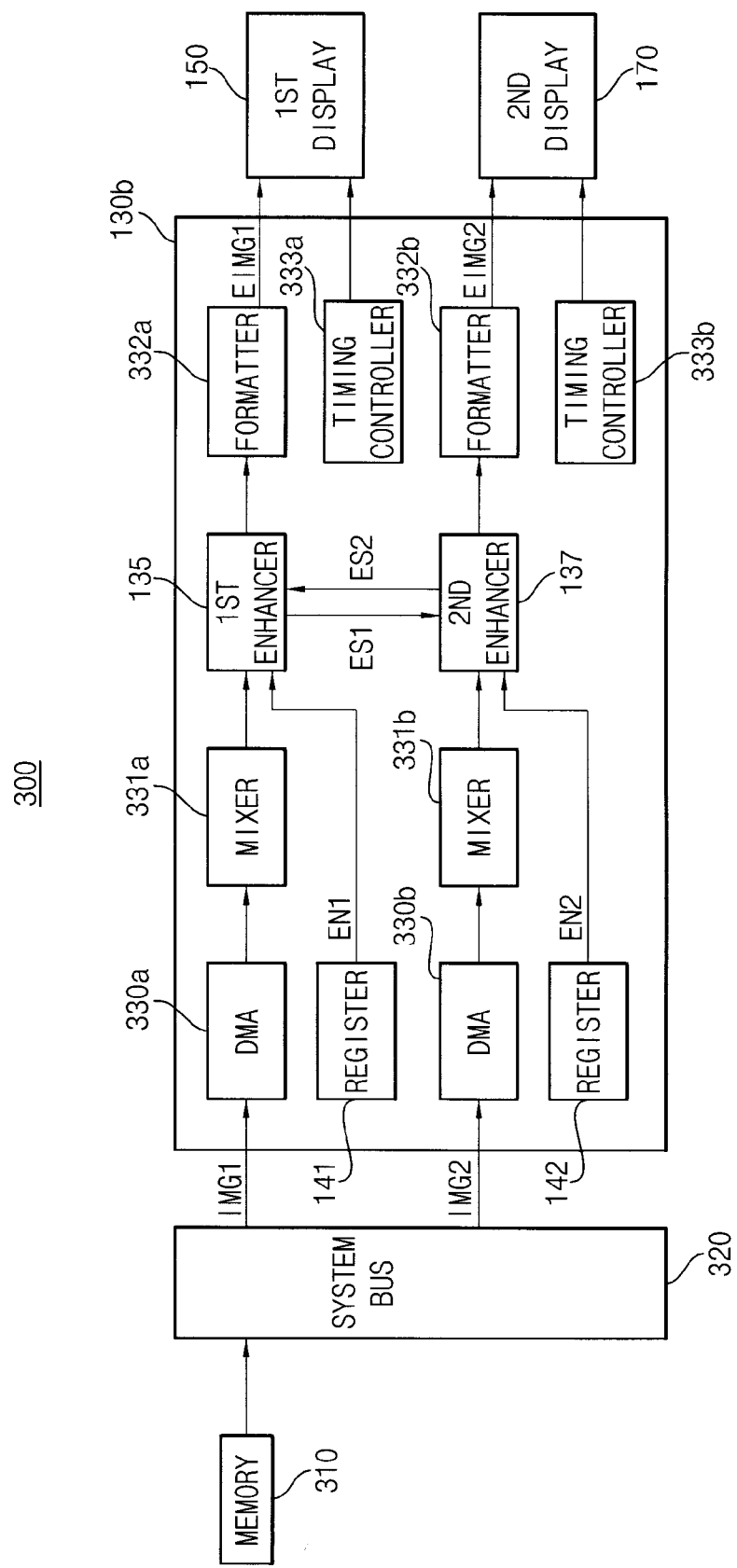
FIG. 5 is a block diagram illustrating a system including the image processing device of FIG. 4.

FIG. 5 is a block diagram illustrating a system including the image processing device of FIG. 4.

Referring to FIG. 5, a system 300 includes a memory device 310, a system bus 320, an image processing device 130b, a first display device 150, and a second display device 170. The image processing device 130b may include a first image enhancer 135, a second image enhancer 137, a first register 141 and a second register 142. The image processing device 130b may further include direct memory access (DMA) controllers 330a and 330b, mixers 331a and 331b, formatters 332a and 332b, and timing controllers 333a and 333b.

As described above, the memory device 310 and the image processing device 130b may communicate with each other through the system bus 320. The image processing device 130b may receive first image data IMG1 and second image data IMG2 under control of the DMA controllers 330a and 330b. Using such DMA controllers 330a and 330b, the image processing device 130b may receive the input image data IMG1 and IMG2 independently of another processor such as a CPU coupled to the system bus 320. The DMA controllers 330a and 330b may include respective input-output interfaces to control data transfer through the system bus 320.

Each mixer may combine a plurality of sub-image data into one image. That is, the first mixer 331a may receive a first plurality of sub-image data and combine the first plurality of sub-image data to generate the first image data IMG1, and the second mixer 331b may receive a second plurality of sub-image data and combine the second plurality of sub-image data to generate the second image data IMG2. Each mixer may provide the image data corresponding to one image by combining the sub-images from a plurality of application programs.

Each timing controller may control a timing of displaying an image corresponding to each enhanced image data in each display device. That is, the first timing controller 333a may control a timing of displaying an image corresponding to the first enhanced image data EIMG1 in the first display device 150, and the second timing controller 333b may control a timing of displaying an image corresponding to the second enhanced image data EIMG2 in the second display device 170.

The formatters 332a and 332b may convert the outputs of the image enhancers 135 and 137 so that the enhanced image data EIMG1 and EIMG2 may have appropriate formats to be displayed in the corresponding display devices 150 and 170.

As described with reference to FIG. 4, the registers 141 and 142 may output the enable signals EN1 and EN2 to the image enhancers 135 and 137.

Figure 6:
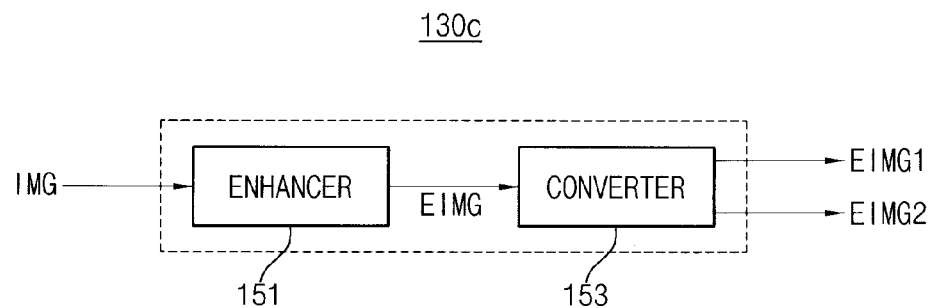
FIG. 6 is a block diagram illustrating an image processing device according to still another exemplary embodiment.

FIG. 6 is a block diagram illustrating an image processing device according to still another exemplary embodiment.

Referring to FIG. 6, an image processing device 130c includes an image enhancer 151 and an image converter 153.

The image enhancer 151 receives input image data IMG and generates enhanced image data EIMG based on the input image data IMG. The input image data IMG may correspond to a single image or correspond to two or more images that are sequentially input. When the input image data IMG correspond to a single image, one image enhancer 151 converts the entire input image data IMG into the enhanced image data EIMG, and thus the enhanced image data EIMG may be divided into a plurality of portions having homogeneous quality.

The image converter 153 receives the enhanced image data EMIG, converts a first portion of the enhanced image data EIMG into first enhanced image data EIMG1 to be provided to one display device, and converts a second portion of the enhanced image data EIMG into second enhanced image data EIMG2 to be provided to another display device. Since the enhanced image data EIMG are converted by analyzing the entire input image data IMG, the first and second enhanced image data EIMG1 and EIMG2 may have substantially the same quality. Accordingly the two images corresponding to the two enhanced image data EIMG1 and EIMG2 may be displayed by the two display devices without causing visual heterogeneity.

Even though FIG. 6 illustrates the image processing device 130c that provides the enhanced image data EIMG1 and EIMG2 for the two display devices, the image processing device 130c may provide the enhanced image data for three or more display devices. In other words, the image processing device 130c may include an image enhancer and an image converter such that the image enhancer provides enhanced image data corresponding to a single image and the image converter provide N enhanced image data for N display devices, where N is an arbitrary natural number greater than two.

Figure 7:
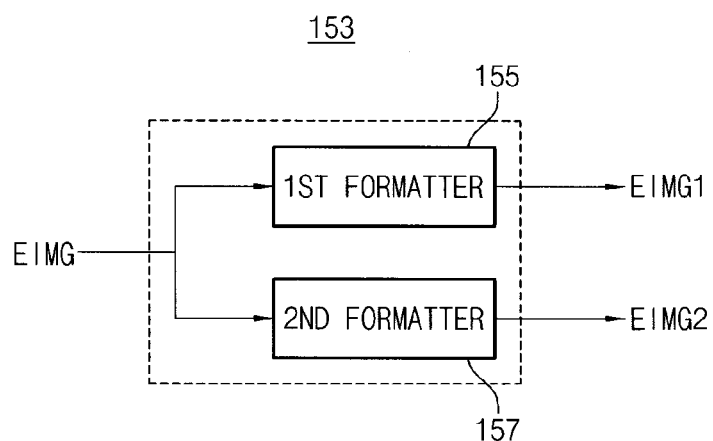
FIG. 7 is a block diagram illustrating an image converter included in the image processing device of FIG. 6.

FIG. 7 is a block diagram illustrating an image converter included in the image processing device of FIG. 6.

Referring to FIG. 7, the image converter 153 may include a first formatter 155 and a second formatter 157. The first formatter 155 converts the first portion of the enhanced image data EIMG into the first enhanced image data EIMG1 to be provided to one display device, and the second formatter 157 converts the second portion of the enhanced image data EIMG into second enhanced image data EIMG2 to be provided to another display device. The formatters 155 and 157 may convert the input data into output data having appropriate formats to be displayed on the corresponding display devices. The first formatter 155 may receive the entire enhanced image data EIMG and convert the first portion of the enhanced image data EIMG into the first enhanced image data EIMG1 having an appropriate format for a display device, and second formatter 157 may receive the entire enhanced image data EIMG and convert the second portion of the enhanced image data EIMG into the second enhanced image data EIMG2 having an appropriate format for another display device.

Figure 8:
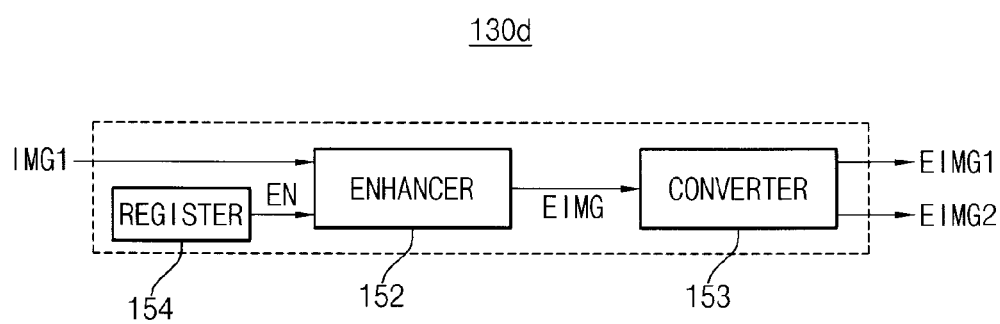
FIG. 8 is a block diagram illustrating an image processing device according to still another exemplary embodiment.

FIG. 8 is a block diagram illustrating an image processing device according to still another exemplary embodiment.

Referring to FIG. 8, an image processing device 130d includes an image enhancer 152, an image converter 153, and a control unit 154. The image enhancer 152 receives input image data IMG and generates enhanced image data EIMG based on the input image data IMG.

The control unit 154 generates an enable signal EN based on the information regarding whether the first enhanced image data EIMG1 and the second enhanced image data EIMG2 are correlated with each other. The correlation of the first and second enhanced image data EIMG1 and EIMG2 may correspond to correlation of first and second portions of the input image data IMG, where the first portion is to be converted into the first enhanced image data EIMG1 and the second portion is to be converted into the second enhanced image data EIMG2. The correlation information may be determined based on the relation between the first portion and the second portion of the input image data IMG. For example, when the input image data IMG correspond to a single image, and the input image data IMG are divided into the first and second portions corresponding to two images for two display devices, the first and second enhanced image data EIMG1 and EIMG2 may be considered as being correlated. In this case, the first and second enhanced image data EIMG1 and EIMG2 are required to have substantially the same quality so that the displayed images by the two display devices do not cause visual heterogeneity. The image processing device 130d may process the first and second portions of the input image data IMG with the same method and the same extent of image enhancing, when the first and second portions are correlated. In contrast, the data corresponding to two distinct images may be sequentially input to the image processing device 130d, for example, in a form of a bit stream. Whether the first and second portions of the input image data IMG are correlated may be determined according to nature of images corresponding to the first and second portions of the input image data IMG to be processed, characteristics of the application programs providing the input image data IMG, or input operation of the user.

The image enhancer 152 may simultaneously process the first and second portions of the input image data IMG by analyzing the entire input image data IMG or process each of the first and second portions of the input image data IMG independently of each other. When the first and second portions of the input image data IMG are not correlated, for example, when the first and second portions are distinct from each other, there is no necessity of considering the visual heterogeneity between the images. In other words, it is desirable to process each of the first and second portions of the input image data IMG independently of each other when the first and second portions are not correlated.

The control unit 154 may generate an enable signal EN based on the above-mentioned information regarding whether the first and second portions of the input image data IMG are correlated with each other. The image enhancer 152 may determine the method of image enhancing process based on the enable signal EN. The control unit 154 may deactivate the enable signal EN when the first and second portions of the input image data IMG are not correlated. In this case, the image enhancer 152 may process the first portion by analyzing the first portion regardless of the second portion, and may process the second portion by analyzing the second portion regardless of the first portion. Such independent processes of the first and second portions may be performed sequentially by the image enhancer 152.

The information regarding whether the first and second portions of the input image data IMG are correlated may be included in the input image data IMG or may be provided by a signal distinct from the input image data IMG. The correlation information may be determined according to characteristics of the input image data IMG, or may be determined by an external control signal. For example, the correlation information may be determined by input operation of the user. The control unit 154 may control the correlated or independent processes of the image enhancer 152 based on the enable signal EN.

In some exemplary embodiments, the control unit 154 may include a register configured to generate the enable signal EN to control the operation of the image enhancer 152.

Even though FIG. 8 illustrates the image processing device 130d that processes the image data for the two display devices, the image processing device 130d may process image data for three or more display devices. That is, the image processing device 130d may convert N portions of the input image data IMG into N enhanced image data for N display devices where N is an arbitrary natural number greater than two.

Figure 9:
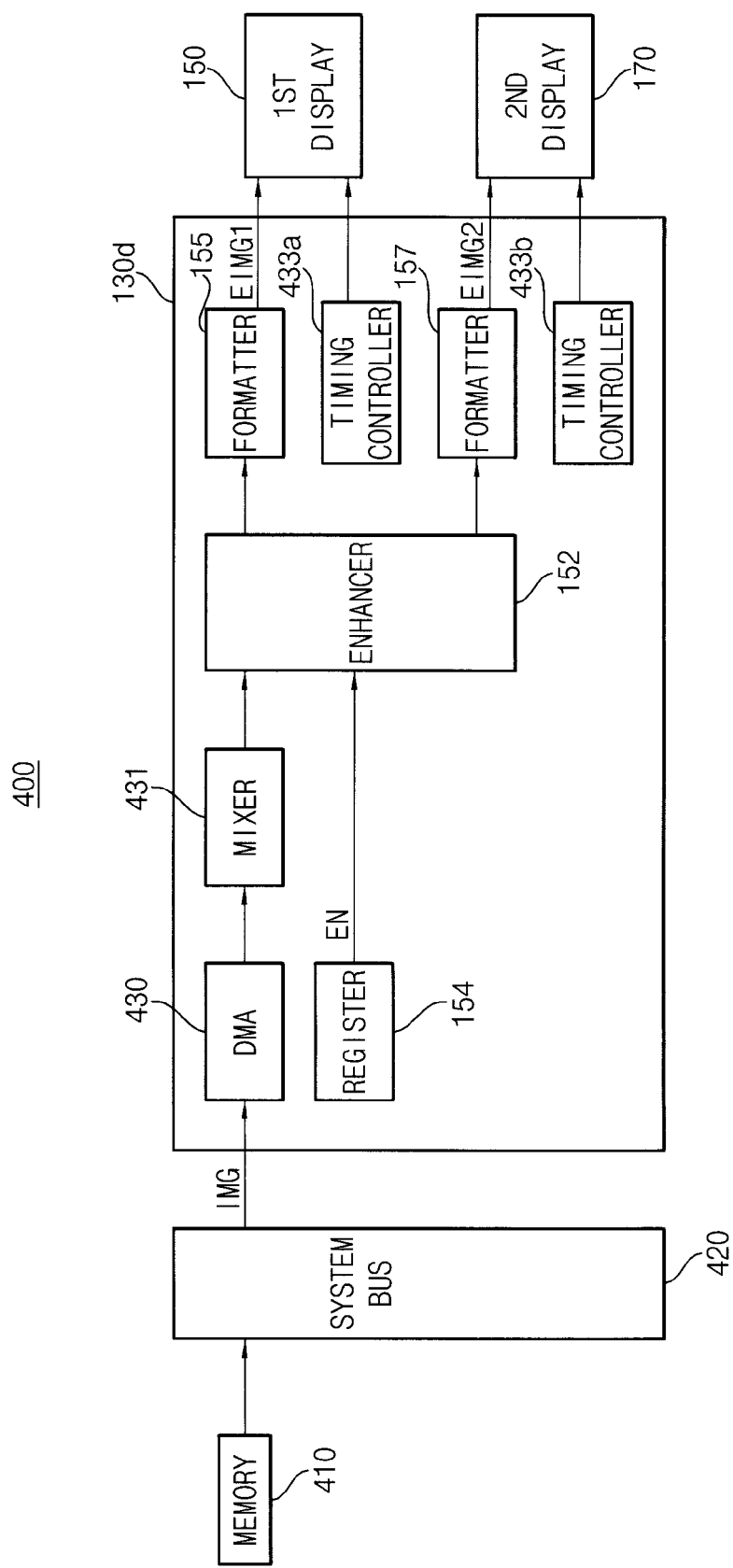
FIG. 9 is a block diagram illustrating a system including the image processing device of FIG. 8.

FIG. 9 is a block diagram illustrating a system including the image processing device of FIG. 8.

Referring to FIG. 9, a system 400 includes a memory device 410, a system bus 420, an image processing device 130d, a first display device 150, and a second display device 170. The image processing device 139d includes an image enhancer 152, a first formatter 155, a second formatter 157 and a control unit 154 as described with reference FIGS. 7 and 8. The image processing device 130d may further include a direct memory access (DMA) controller 430, a mixer 431, and timing controllers 433a and 433b.

As described above, the memory device 410 and the image processing device 130d may communicate with each other through the system bus 420. The image processing device 130d may receive an input image data IMG under control of the DMA controller 430. The mixer 431 may combine a plurality of sub-image data into one image. That is, the mixer 431 may receive the plurality of sub-image data and combine the plurality of sub-image data to generate the input image data IMG. When a plurality of application programs is driven in the system 400, the sub-images provided by the applications are required to be combined into one image. For example, the mixer 430 may combine on-screen display (OSD) data and pure image data into the input image data IMG.

Each timing controller may control a timing of displaying an image corresponding to each enhanced image data in each display device. That is, the first timing controller 433a may control a timing of displaying an image corresponding to the first enhanced image data EIMG1 in the first display device 150, and the second timing controller 433b may control a timing of displaying an image corresponding to the second enhanced image data EIMG2 in the second display device 170. The formatters 155 and 157 may convert the outputs of the image enhancer 152 so that the enhanced image data EIMG1 and EIMG2 may have appropriate formats to be displayed in the corresponding display devices 150 and 170.

In some exemplary embodiments, the input image data IMG may be received from the memory device 410 as illustrated in FIG. 9. In other exemplary embodiments, the input image data IMG may be received as an image stream.

Figure 10:
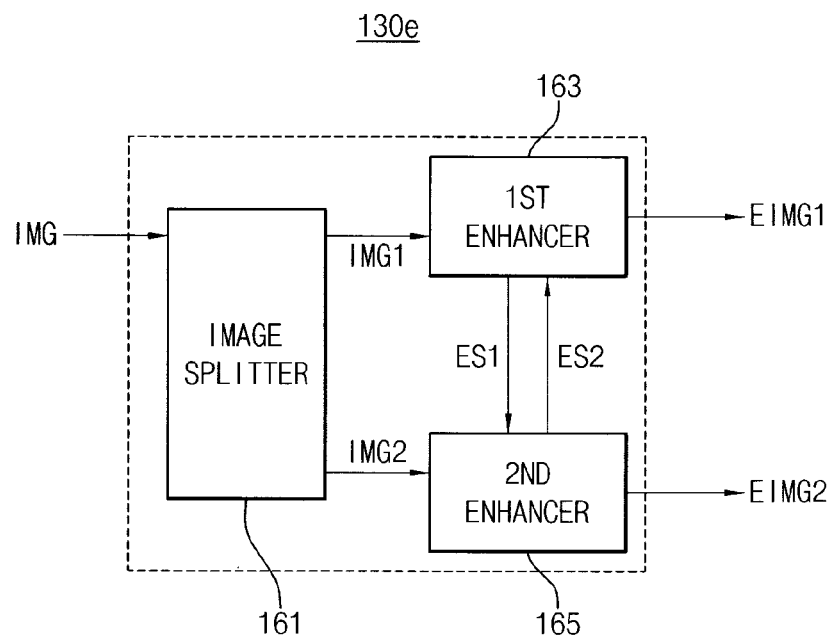
FIGS. 10 and 11 are block diagrams illustrating image processing devices according to other exemplary embodiments.
Figure 11:
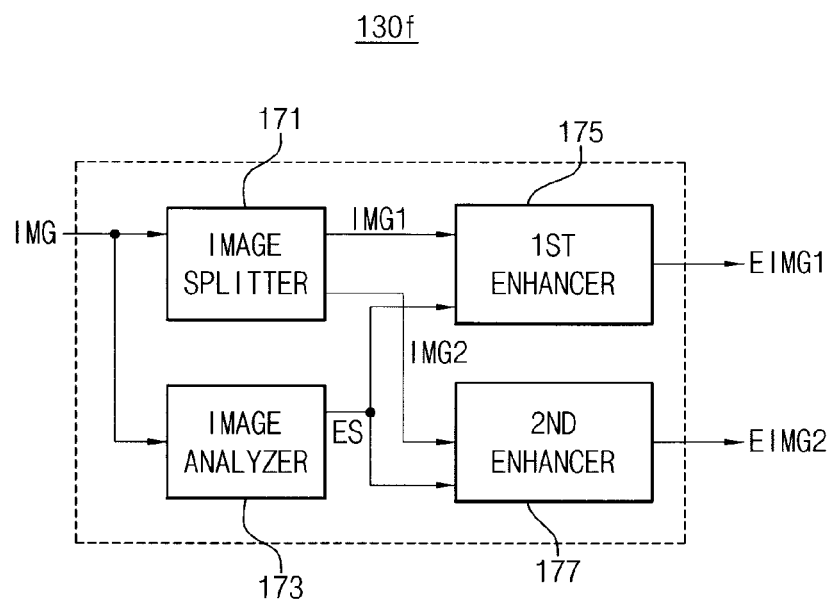

FIGS. 10 and 11 are block diagrams illustrating image processing devices according to other exemplary embodiments.

Referring to FIG. 10, an image processing device 130e may include an image splitter 161, a first image enhancer 163 and a second image enhancer 165.

The image splitter 161 may receive input image data IMG, divide the input image data IMG into a first image data IMG1 and a second image data IMG2 and output the first and second image data IMG1 and IMG2 to the first and second image enhancers 163 and 165, respectively.

Similar to the exemplary embodiment of FIG. 2, the first image enhancer 163 receives the first image data IMG1 and generates first image enhancement information ES1 by analyzing the first image data IMG1. The first image enhancement information ES1 may be used for image processing not only in the first image enhancer 163 but also in the second image enhancer 165. For such correlated image processing, the first image enhancement information ES1 may be provided to the second image enhancer 165 and the first image enhancer 163 may receive second image enhancement information ES2 from the second image enhancer 165. The first image enhancer 163 converts the first image data IMG1 into first enhanced image data EIMG1 based on the first image enhancement information ES1 and the second image enhancement information ES2. The first enhanced image data EIMG1 is provided to and displayed by the first display device 150 of FIG. 1. The first image enhancer 163 may convert the first image data IMG1 to the first enhanced image data EIMG1 based on the second image enhancement information ES2 as well as the first image enhancement information ES1. The second image enhancer 165 receives the second image data IMG2 and generates the second image enhancement information ES2 by analyzing the second image data IMG2. The second image enhancement information ES2 may be used for image processing not only in the second image enhancer 165 but also in the first image enhancer 163. The second image enhancer 165 may convert the second image data IMG2 to the second enhanced image data EIMG2 based on the first image enhancement information ES1 as well as the second image enhancement information ES2. Accordingly, through such correlated image processing, visual heterogeneity between the images may be reduced or prevented.

Referring to FIG. 11, an image processing device 130f may include an image splitter 171, an image analyzer 173, a first image enhancer 175 and a second image enhancer 177.

Similar to the exemplary embodiment of FIG. 11, the image splitter 171 may receive input image data IMG, divide the input image data IMG into first image data IMG1 and second image data IMG2 and output the first and second image data IMG1 and IMG2 to the first and second image enhancers 175 and 177, respectively.

The image analyzer 173 may analyze the input image data IMG to generate image enhancement information ES. In the exemplary embodiments of FIGS. 2, 4 and 10, the first image enhancer and second image enhancer require input-output means for sharing the image enhancement information of each other. In contrast, in the exemplary embodiment of FIG. 11, the image analyzer 173 generates the image enhancement information ES including the information on both of the first and second image data IMG1 and IMG2. The image analyzer 173 provides the image enhancement information ES to both of the first and second image enhancers 175 and 177, and thus communication between the first and second image enhancers 175 and 177 may be omitted. The first and second image enhancers 175 and 177 may perform the above mentioned correlated image processing based on the image enhancement information ES from the image analyzer 173.

Figure 12A:
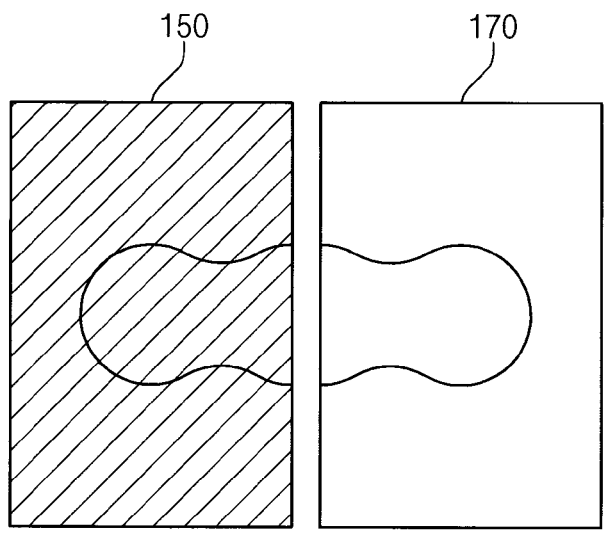
FIGS. 12A and 12B are diagrams for describing the effect of homogeneous image processing by the image processing device according to exemplary embodiments.
Figure 12B:
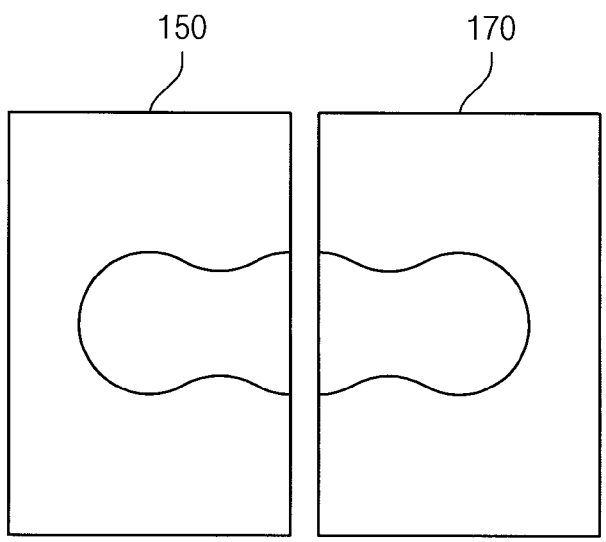

FIGS. 12A and 12B are diagrams for describing the effect of homogeneous image processing by the image processing device according to exemplary embodiments.

FIG. 12A illustrates the case that the first display device 150 and the second display device 170 display two images that are processed independently. In other words, the first image on the first display device 150 corresponds to the first enhanced image data processed by the first image enhancer regardless of the second image, and the second image on the second display device 170 corresponds to the second enhanced image data processed by the second image enhancer regardless of the first image. In this case, visual heterogeneity represented by FIG. 12A may be caused due to the difference of image enhancing processes by the image enhancers. Such visual heterogeneity increases as the difference of image enhancing processes increases.

FIG. 12B illustrates the case that the first display device 150 and the second display device 170 display two images that are processed by the correlated or homogeneous image processing according to exemplary embodiments. Through such correlated image processing, the visual heterogeneity experienced by the user may be reduced or prevented.

Even though the correlated image processing has been described mainly based on the exemplary embodiments of processing two images, it will be easily understood that three or more images may be processed without causing visual heterogeneity using the correlated image processing according to the present inventive concept.

Figure 13:
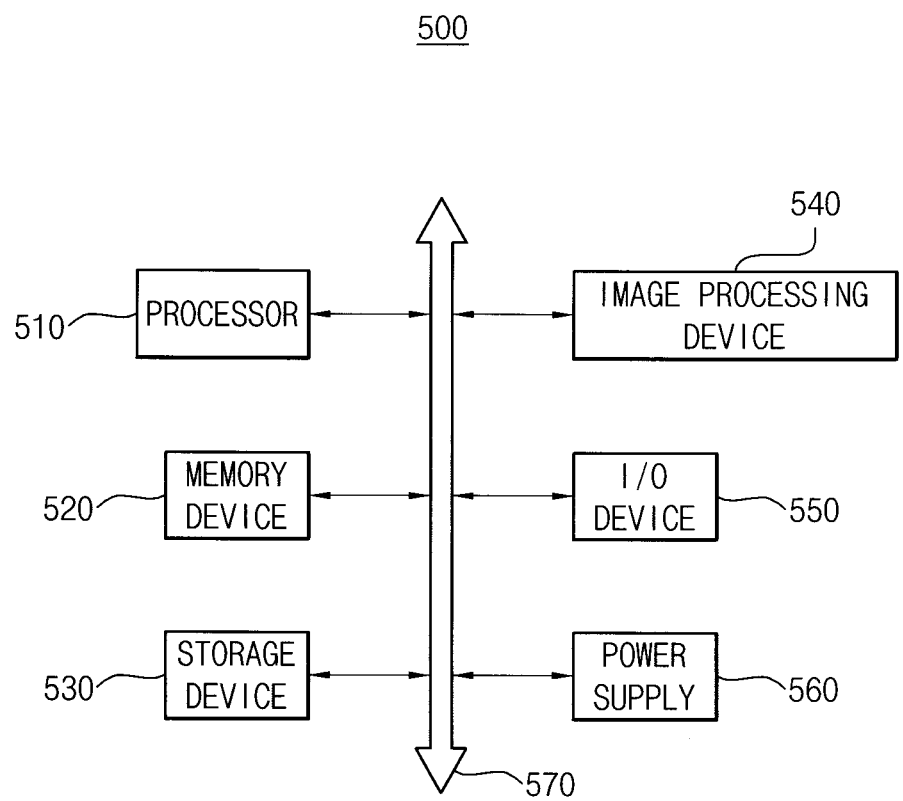
FIG. 13 is a block diagram illustrating a system including an image processing device according to exemplary embodiments.

FIG. 13 is a block diagram illustrating a system including an image processing device according to exemplary embodiments.

Referring to FIG. 13, a system 500 may include a processor 510, a memory device 520, a storage device 530, an image processing device 540, an input/output device 550, a power supply 560 and a system bus 570. Although it is not illustrated in FIG. 13, the system 500 may further include ports that communicate with a video card, a sound card, a memory card, a USB device, or other electronic devices.

The processor 510 may perform various calculations or tasks. According to exemplary embodiments, the processor 510 may be a microprocessor or a CPU. The processor 510 may communicate with the memory device 520, the storage device 530, the image processing device 540 and the input/output device 550 via the system bus 570. The system bus 570 may include an address bus, a control bus, and/or a data bus. In some exemplary embodiments, the processor 510 may be coupled to an extended bus, such as a peripheral component interconnection (PCI) bus. The memory device 520 may store data for operating the system 500. For example, the memory device 520 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 530 may include a solid state drive (SSD), a hard disk drive (HDD), a CD-ROM, etc. The input/output device 550 may include an input device (e.g., a keyboard, a keypad, a mouse, etc.) and an output device (e.g., a printer, a display device, etc.). The power supply 560 supplies operation voltages for the system 500.

The image processing device 540 may communicate with the processor 510 via the system bus 570 or other communication links. The image processing device may communicate with the memory device 520 under control of a DMA controller. As described above, the image processing device 540 may perform homogeneous image processing to provide a plurality of images that are displayed by a plurality of display devices without causing visual heterogeneity.

The present inventive concept may be applied to an arbitrary device or system including a plurality of display devices. Particularly the present inventive concept may be applied to a mobile device adopting multiple displays such as a mobile phone, a portable media player (PMP), a digital camera, a portable gaming station, etc.

Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other example embodiments, are intended to be included within the scope of the appended claims.

What is claimed is:

1. An image processing device comprising:
   a first image enhancer configured to receive first image data and generate first image enhancement information by analyzing the first image data, and configured to convert the first image data into first enhanced image data using at least one of the first image enhancement information and second image enhancement information selected based on information regarding whether the first image data and the second image data are correlated with each other; and
   a second image enhancer configured to receive second image data and generate the second image enhancement information by analyzing the second image data, and configured to convert the second image data into second enhanced image data using at least one of the first image enhancement information and the second image enhancement information selected based on the information regarding whether the first image data and the second image data are correlated with each other.

2. The image processing device of claim 1, wherein each of the first image enhancement information and the second image enhancement information includes at least one of image brightness information, image contrast information and image histogram information.

3. The image processing device of claim 1, wherein the first image enhancer and the second image enhancer are configured to convert the first image data and the second image data into the first enhanced image data and the second enhanced image data, respectively, by performing at least one of brightness correction, contrast correction, color correction and noise removal.

4. The image processing device of claim 1, wherein the first image data and the second image data are received from an external memory device.

5. The image processing device of claim 4, further comprising:
   a direct memory access controller configured to directly communicate with the external memory device through a system bus.

6. The image processing device of claim 1, wherein the first image data and the second image data are received as an image stream.

7. The image processing device of claim 1, further comprising:
   a first mixer configured to receive a first plurality of sub-image data and configured to combine the first plurality of sub-image data to generate the first image data; and
   a second mixer configured to receive a second plurality of sub-image data and configured to combine the second plurality of sub-image data to generate the second image data.

8. The image processing device of claim 1, further comprising:
   a first timing controller configured to control a timing of displaying an image corresponding to the first enhanced image data in a first display device; and
   a second timing controller configured to control a timing of displaying an image corresponding to the second enhanced image data in a second display device.

9. The image processing device of claim 1, wherein the first image enhancer and the second image enhancer are integrated in a single system-on-chip.

10. An image processing device comprising:
    a first image enhancer configured to receive first image data and generate first image enhancement information by analyzing the first image data, and configured to convert the first image data into first enhanced image data based on the first image enhancement information and second image enhancement information;
    a second image enhancer configured to receive second image data and generate the second image enhancement information by analyzing the second image data, and configured to convert the second image data into second enhanced image data based on the first image enhancement information and the second image enhancement information; and
    a control unit configured to generate a first enable signal and a second enable signal based on information regarding whether the first image data and the second image data are correlated with each other.

11. The image processing device of claim 10, wherein the control unit is configured to deactivate the first enable signal and the second enable signal when the first image data and the second image data are not correlated with each other,
    the first image enhancer is configured to convert the first image data into the first enhanced image data based on the first image enhancement information regardless of the second image enhancement information when the first enable signal is deactivated, and
    the second image enhancer is configured to convert the second image data into the second enhanced image data based on the second image enhancement information regardless of the first image enhancement information when the second enable signal is deactivated.

12. The image processing device of claim 10, wherein the control unit includes:
    a first register configured to generate the first enable signal; and
    a second register configured to generate the second enable signal.

13. An image processing system comprising:
    a system bus;
    an image processing device electrically connected to the system bus; and
    a memory device which stores image data and is electrically connected to the system bus, a direct memory access controller through which the image processing device receives image data from the memory device, wherein the image processing device comprises a direct memory access controller through which the image processing device receives first and second image data from the memory device, wherein the image processing device processes the first image data in part based on at least one of image brightness information, image contrast information, and image histogram information obtained by analyzing the second received image data and outputs first enhanced image data when the first image data and the second image data are correlated with each other, and wherein the image processing device processes the second image data in part based on at least one of image brightness information, image contrast information, and image histogram information obtained by analyzing the first received image data and outputs second enhanced image data when the first image data and the second image data are correlated with each other.

14. The system as recited in claim 13, wherein the image processing device comprises a first enhancer which receives the first image information and analyzes the first image information to determine the at least one of image brightness information, image contrast information, and image histogram information of the first image information, and a second enhancer which receives the second image information and analyzes the second image information to determine the at least one of image brightness information, image contrast information, and image histogram information of the second image information.

15. The system as recited in claim 14, wherein when the image processing device determines the first and second image data are distinct from each other, the first and second image data are processed independently of each other.

16. The system as recited in claim 14, wherein when the image processing device determines the first and second image data are correlated with each other, the first and second enhanced image data output by the first and second enhancers, respectively, have substantially the same quality.

17. The system as recited in claim 16, wherein correlation of the first and second image data is determined based on at least one of the nature of images corresponding to the first and second image data to be processed, characteristics of application programs providing the image data, or input operation of a user.

* * * * *